United States Patent [19]

Staple

[11] Patent Number: 5,383,133
[45] Date of Patent: Jan. 17, 1995

[54] INTEGRATED VIBRATION REDUCING AND HEALTH MONITORING SYSTEM FOR A HELICOPTER

[75] Inventor: Alan E. Staple, Stoke-sub-Hamdon, England

[73] Assignee: Westland Helicopters Limited, Yeovil, England

[21] Appl. No.: 966,400

[22] Filed: Oct. 26, 1992

[30] Foreign Application Priority Data

Nov. 2, 1991 [GB] United Kingdom ............... 9123304

[51] Int. Cl.6 ........................ F16F 15/10; G01H 11/00
[52] U.S. Cl. ............................. 364/508; 364/424.06; 73/583; 340/963
[58] Field of Search .............. 364/508, 551.01, 424.06, 364/424.03, 424.04, 574; 73/583, 588, 662, 663, 668; 244/17.13; 340/963

[56] References Cited

U.S. PATENT DOCUMENTS

| 4,213,114 | 7/1980 | Cochard | 340/27 R |
| 4,683,542 | 7/1987 | Taniguti | 364/508 |
| 4,819,182 | 3/1989 | King et al. | 364/508 |
| 4,953,098 | 8/1990 | Fischer et al. | 364/508 |
| 5,049,795 | 9/1991 | Moulds, III | 318/561 |
| 5,070,655 | 12/1991 | Aggarwal | 51/165.71 |
| 5,219,143 | 6/1993 | Staple et al. | 248/550 |
| 5,239,468 | 8/1993 | Sewersky et al. | 364/424.03 |
| 5,243,512 | 9/1993 | Putman et al. | 364/148 |
| 5,245,552 | 9/1993 | Andersson et al. | 364/508 |
| 5,313,407 | 5/1994 | Tiernan et al. | 364/508 |

Primary Examiner—Michael Zanelli
Attorney, Agent, or Firm—Larson & Taylor

[57] ABSTRACT

This invention monitors data produced by a vibration reducing system relating to the vibration of a structure, compares the data against a predetermined value and provides a warning if the predetermined value is exceeded to provide an integrated vibration reducing and structural health monitoring system.

4 Claims, 2 Drawing Sheets

INTEGRATED VIBRATION REDUCING AND HEALTH MONITORING SYSTEM FOR A HELICOPTER

BACKGROUND OF THE INVENTION

1. Field of the Invention

This invention relates to integrated vibration reducing and health and usage monitoring systems.

2. Description of the Prior Art

U.S. Pat. No. 4,819,182 discloses a vibration reducing system particularly suited for use in reducing vibration in a helicopter fuselage. To that end the prior system generates continuously a great deal of information about the structural dynamics at a range of main rotor induced harmonics, as well as information on the vibration status of the helicopter at a plurality of locations.

Health and usage monitoring (HUM) systems are being used increasingly in helicopters and as the name suggests such systems incorporate means to monitor the health and usage of both mechanical and structural components as an aid to maintenance activities and to provide warnings of impending failures which might imperil the helicopter. Additionally, vibration of a helicopter is usually monitored to provide a basis for diagnostic activity again to highlight an impending fault at an early stage.

Structural health and monitoring systems and vibration monitoring systems rely on information concerning the dynamic characteristics of the structure as well of course as the levels of vibration, and, since such information is also utilised in the aforementioned vibration reducing system, the inventor decided to investigate whether at least structural health monitoring and vibration monitoring and diagnostic systems might be integrated with vibration reducing systems thereby reducing complexity and weight.

An objective of this invention therefore is to provide such an integrated vibration reducing and health monitoring system in which various data used in the vibration reducing system are utilised also to provide a health monitoring facility.

A further objective is to provide such an integrated system which reduces vibration and provides a structural health monitoring facility and a vibration monitoring and diagnostic facility.

SUMMARY OF THE INVENTION

Accordingly, in one aspect this invention provides an integrated vibration reducing and health monitoring system including a plurality of vibration sensors located on a structure for providing data consisting of signals representative of vibration of the structure to a computer responsive to said data and adapted to calculate actuator demand signals for operating a plurality of actuators to input forces into the structure and reduce vibration of the structure, monitoring means for monitoring said data, comparing said monitored data against a predetermined value and providing a warning signal if said predetermined value is exceeded.

In another aspect this invention provides an integrated vibration reducing and health monitoring system including a plurality of vibration sensors located on a structure, a computer and a plurality of actuators for inputting forces into the structure to reduce vibration of the structure, said sensors providing first data comprising signals representative of the vibration of the structure to the computer for construction of second data comprising a transfer matrix representing a linear transfer relationship between the vibration responses measured by the sensors and the output forces of the actuators, and producing third data comprising actuator command signals for inputting calculated actuator control forces, monitoring means for monitoring at least one of said data, comparing said monitored data against a predetermined value and providing a warning signal if said predetermined value is exceeded.

The predetermined value may comprise a maximum value and said warning signal may be produced if said monitored data exceeds that value. Alternatively the predetermined value may comprise an allowable rate of change and said warning signal may be produced if the monitored rate of change exceeds the allowable rate of change.

Preferably, said system monitors said second data comprising the transfer matrix and said monitoring means compares said transfer matrix data against a predetermined allowable range and produces a warning signal if said data moves outside said allowable range.

The monitoring means may include a computer programmed with information relating to patterns of vibration response characteristics related to specific structural and component defects whereby said monitoring means provides information relating to the cause of the data exceedance.

The structure may comprise a helicopter fuselage structure.

In yet another aspect the invention provides a method for integrating a health monitoring system with a structural vibration reducing system having a plurality of vibration sensors located on the structure for providing data representative of the vibration of the structure, said method comprising the steps of monitoring said data, comparing said monitored data against a predetermined value and producing a warning signal if said predetermined value is exceeded.

The invention will now be described by way of example only and with reference to the accompanying drawings in which,

DETAILED DESCRIPTION OF THE DRAWINGS

Figure 1:
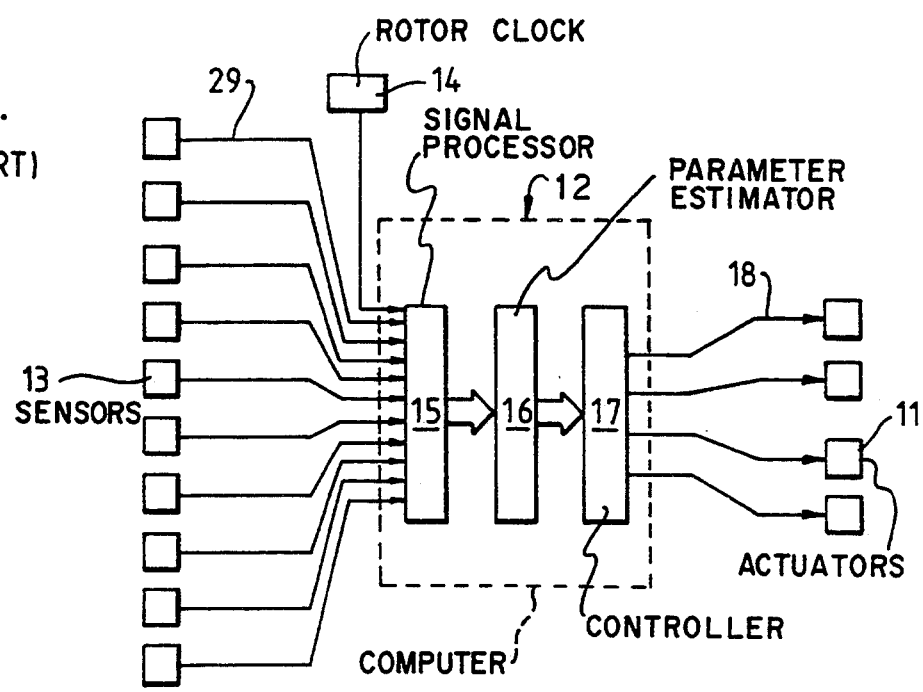
FIG. 1 is a schematic representation of the prior art vibration reducing system disclosed in U.S. Pat. No. 4,819,182.

One embodiment of the prior art vibration reducing system adapted particularly for use in reducing vibration in a helicopter is shown in FIG. 1. The system includes four electro-hydraulic actuators 11 located in a main rotor gearbox support structure, a micro-processor based control unit or computer 12 and ten vibration sensors 13 (such as accelerometers) distributed around the helicopter airframe structure.

The success of the prior art system in minimising vibration depends on optimal placement of both actuators 11 and sensors 13 within the vibrating structure. In practice, the actuators 11 are best located close to the source of vibration, i.e. in the main vibratory load transmission path, whilst the sensors 13 are located at sensitive locations, such as crew positions or locations of sensitive components. The control technique presently adopted for the current generation of prior art control units 12 is based on a frequency domain adaptive control scheme whereby the processing of vibration information and actuator commands are synchronised to the prime forcing frequencies of the main rotor, via a main rotor azimuth signal generated by a rotor clock 14. A control unit developed for a particular helicopter has the capability to simultaneously control up to four main rotor harmonics.

Measured raw vibration signals 29 from the accelerometers 13 are analysed in control unit 12 by a digital signal processor 15 and the resulting measured frequency domain vibration data is fed to a parameter estimator 16 which utilises the information to construct a linear transfer matrix relating the airframe vibration responses measured by the accelerometers 13 to the output forces from the actuators 11. The resultant estimates are fed to an optimal controller 17 which calculates the optimum control forces required from the actuators 11 and produces appropriate actuator command signals 18.

Thus control unit 12 senses the residual vibration at the locations of the accelerometers 13 and determines the appropriate vibratory forcing required from the actuators 11 which, when superposed onto the response generated by the main rotor, minimises the residual vibration. The optimal actuator commands from controller 17 are based on an assumed linear transfer matrix relationship between the vibration response and the actuator force. The transfer matrix is effectively the control gain of the system and represents the dynamics of the helicopter at the discrete control harmonics. The transfer matrix is iteratively adjusted by the parameter estimation routine in parameter estimator 16 which attempts to minimise the residual error between the estimated vibration and the actual measured vibration and, in this manner, control unit 12 is able to adapt during flight to changes in dynamic characteristics of the helicopter structure such as may result from fuel usage, load changes, rotor speed fluctuations and forward speed.

It is apparent therefore that in operation of such a system for controlling vibration, information is continuously generated concerning the structural dynamics at a range of main rotor induced harmonics and is in a form which the inventor realised might be suited to use in an integral health monitoring system. The data he considered to be of particular interest in this respect were the raw vibration measurements 29 (magnitude and phase) from the sensors 13, the actuator demand signals 18 (magnitude and phase) from the optimal controller 17 and the transfer matrix determined by the parameter estimator 16.

The inventor discovered that, by monitoring such data and comparing against a predetermined value such as a maximum value or a rate of change value, any exceedances could be used to provide an on-board warning and as a diagnostic tool. Diagnosis could be accomplished either on-board or by downloading recorded data to a ground station or both. For example, the parameter estimator 16 calculates the changes in airframe dynamics by tracking the transfer matrix between measured vibration and actuator command signals at the dominant main rotor frequencies, and adjusts the estimation only when significant dynamic change has occurred. Such a parameter estimation technique could therefore be used to provide information of both sudden and cumulative changes in the structural dynamics which may then be interpreted to provide information on the structural health of the helicopter and relating for example to fatigue damage, accidental damage and component degradation.

Clearly, in order to be of use as a diagnostic tool it will be necessary to distinguish between those changes in dynamics due to normal in-flight variations and those due to structural defects or component degradation.

Additionally, the prior art vibration reducing system provides information on the vibration status of the helicopter at all of the sensor locations and the inventor realised that the system also had the potential to be used as an integrated vibration monitoring and diagnostic tool. The use of vibration information as a maintenance tool is known, and current helicopter systems often utilise information from a single triaxial accelerometer, which information is recorded during flight for post flight analysis in a ground station and inclusion in a vibration data base. Clearly the prior art vibration reducing system has the potential to provide advantages over such a known system since information is generated at a large number of accelerometers 13 and is analysed within the control unit 12 by signal processor 15. The inventor argued that such vibration information from a wide spread of locations, directions and frequencies would enhance the diagnostic capabilities and could either be downloaded after analysis in control unit 12 directly to a ground station, or the raw information from the sensors 13 could be provided directly to an independent vibration monitoring system.

The primary objective in integrating a diagnostic capability such as structural health monitoring (SHM) or vibration monitoring and diagnostics (VMD) into the prior art vibration reducing system is to provide an indication of changes to the vibration of the helicopter. In particular, such a system should provide information on significant changes to the vibration state of the helicopter which, on a helicopter not equipped with such a vibration reducing system, may be recognised and reported by the flight crew. In this respect the wealth of information extracted and generated by the control unit 12 of the prior art vibration reducing system has the potential to provide a more reliable method of reporting vibration degradation of the helicopter.

Furthermore, the inventor realised that since the existing vibration reducing system is more complex for example than existing passive attenuation devices, it will be necessary in an integrated system to provide information to the flight crew or the ground crew on the functional status of the vibration reducing system in order that corrective maintenance action can be taken where required.

Studies conducted by the inventor in respect of a particular helicopter model showed that significant structural failures have a major impact on the pattern of fuselage vibration and, therefore, a consequential effect on the control variables of the vibration reducing system.

Two embodiments of the integrated vibration reducing and health monitoring system of this invention will now be described with reference to FIGS. 2 and 3 in which items similar to items of the prior art vibration reducing system are identified with the same reference numerals and reference should be had to the prior text for details.

Figure 2:
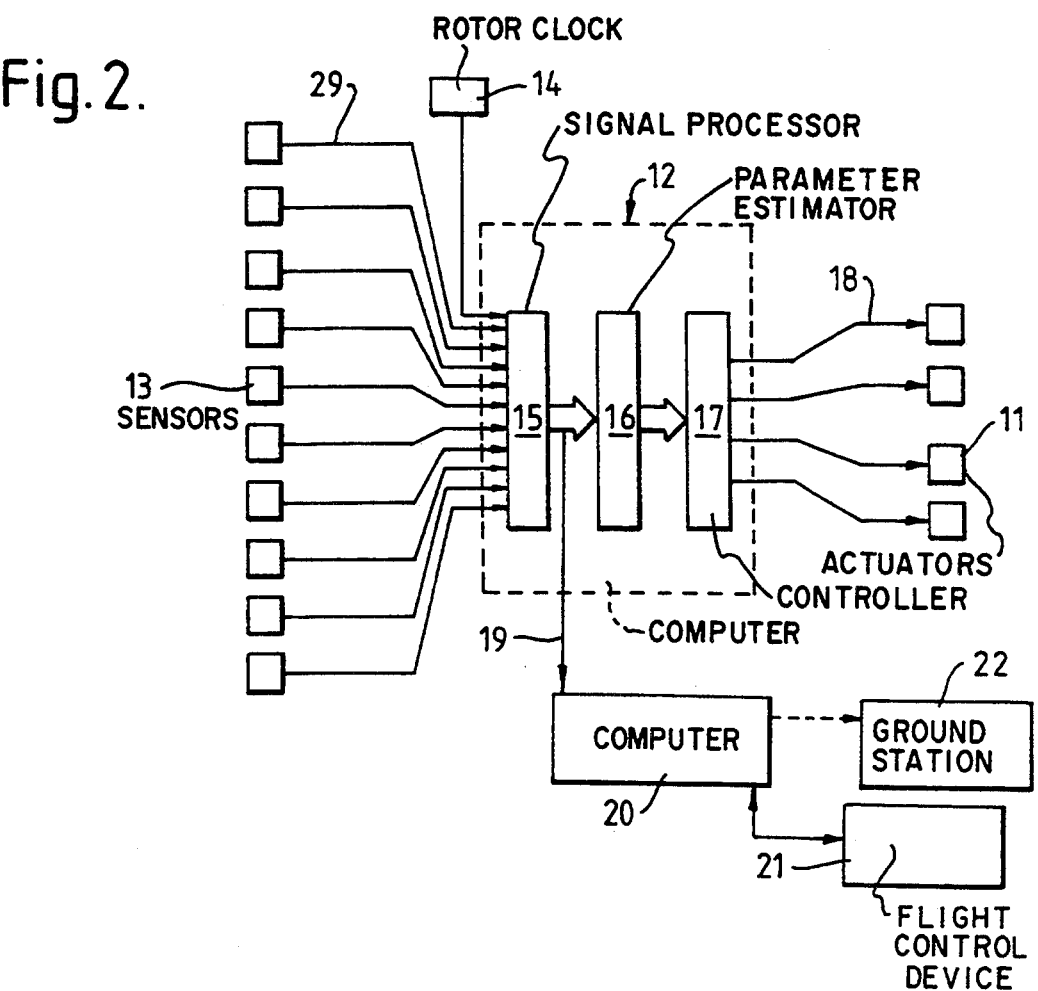
FIG. 2 is a schematic representation of an integrated vibration reducing and health monitoring system according to one embodiment of this invention.

In the simplest form of the invention illustrated in FIG. 2, analysed data 19 comprising signals from the digital signal processor 15 relating to measured vibration levels at the locations of the ten accelerometers 13 is fed to a diagnostic computer 20 which may be a separate unit or may be incorporated in the control unit 12. The computer 20 is operationally connected to a flight control device 21 such as a pilot control panel or computerised aircraft management system which incorporates a provision for downloading data to a ground station 22.

Figure 3:
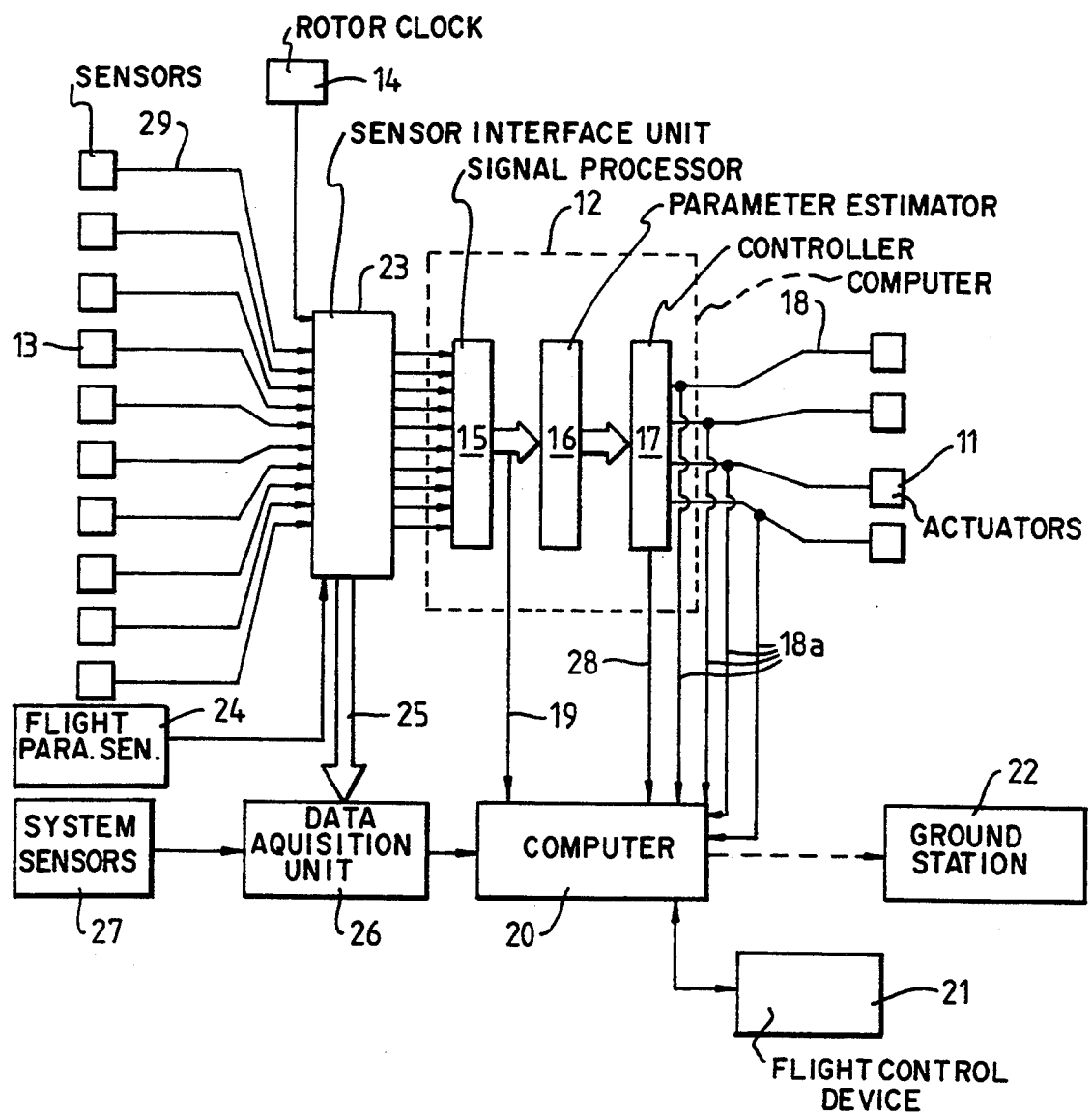
FIG. 3 is a schemtic representation of a further embodiment of the invention.

In the embodiment of FIG. 3, signals from the accelerometers 13 and the rotor clock 14 are fed to a sensor interface unit 23 together with signals from flight parameter sensors 24 such as airspeed sensors. Data 25 comprising signals relating to the raw measured vibration levels at the locations of accelerometers 13 is fed to a data acquisition unit 26 and then to the diagnostic computer 20, and use of this data 25 is in addition to the use of the analysed data 19 as in the embodiment of FIG. 2. In an alternative unillustrated embodiment the raw data 25 may be used instead of the analysed data 19.

Signals from other system sensors 27 such as from a rotor tracking system may also be supplied to data acquisition unit 26.

Second data 28 comprising a signal representative of the transfer matrix constructed in controller 17 is fed to computer 20 along with third data 18a comprising actuator demand signals calculated in controller 17. The system again includes a flight control device 21 such as a pilot control panel or aircraft management system and means for downloading data to a ground station 22.

The integrated vibration reducing and health monitoring system of this invention may utilise either a low level or a high level diagnostic capability.

1) Low level diagnostic system

The purpose of the low level system is to determine whether a significant change has occurred in the structural dynamic and response characteristics of the fuselage structure which is consistent with structural degradation or component failure. The system is implemented by downloading one or more of the data generated in the vibration reducing system such as the measured raw vibration signals data 25, the actuator demand signals data 18a, or the transfer matrix data 28, details of any of which are stored at a preset flight condition in the integrated system of this invention. Should the monitored data exceed a predetermined value a diagnostic warning flag is set on the flight control device 21.

The preferred data to be monitored is the transfer matrix data 28 constructed in controller 17, and which is stored at a preset rotor speed condition since it is largely independent of other helicopter operating conditions.

Thus in a low level diagnostic system the diagnostic computer 20 monitors the available data (depending on the embodiment), compares the monitored data with a predetermined value and in the event of an exceedance thereof, sends a warning signal to the flight control device 21.

2) High level diagnostic system

This system is a more intelligent version of the low level system and operates on the same data generated in the vibration reducing system. This is achieved by diagnostic processing means providing for interpretation of the data based on stored information relating to patterns of vibration response characteristics related to specific structural and component defects built up from specific testing or service experience of the helicopter. In other words the diagnostic processing in the high level system recognises a pattern of changes in the monitored data and provides an indication of the cause of the changes in order to provide a direct indication of the maintenance action required.

In such a high level diagnostic system the computer 20 preferably undertakes the appropriate monitoring and diagnostic function on-board and indicates on device 21 that a problem has occurred as well as a likely cause of the problem. This is particularly important in respect of specific failures whose propagation rate may have an immediate impact on safety.

In both diagnostic systems the computer 20 will also record the data for subsequent downloading to a ground station 22 for further diagnosis and analysis.

An advantage of the high level diagnostic system is that it provides information in respect of the more likely gradual changes in the monitored data which may not be sufficient to indicate a warning to the pilot in the low level system but which can nevertheless be very significant in indicating changing patterns.

Once a significant change is detected in the monitored data the system initiates either in flight or subsequently at a ground station a check of the correct functioning of the vibration reducing system to ensure that no degradation of the system or no sensor or actuator failures have occurred which would usually be identified by a built-in-test facility (BIT), as well as a check of operating parameters such as rotor speed, all up weight, centre of gravity and forward speed.

If no degradation of the vibration reducing system is evident then a significant change in the monitored data will indicate that a significant change to the airframe response characteristics has occurred. Depending on the level of sophistication of the system further diagnostic work may be undertaken such as detailed inspection of airframe and critical components or further check flying or ground runs. Alternatively if the system includes a diagnostic facility, the trending of the monitored data compared with known failure characteristics will provide a direct pointer to the required maintenance action.

The principal diagnostic information generated by the vibration reducing system which can be used as a basis for the integrated vibration reducing and health monitoring system of this invention are:

1. A measurement of the transfer matrix 28 determined from an open loop test with the helicopter on the ground at 100% rotor speed ($N_R$) and maximum power on ground (MPOG) (NOTE: the open loop routine involves applying a predetermined sequence of inputs to the actuators, measuring the vibration response at the accelerometers and calculating the transfer matrix). Preferably this open-loop procedure is automated as part of the helicopter start-up routine as a means of providing the optimal closed loop transfer matrix and to provide diagnostic data.
2. An estimate of the transfer matrix 28 determined in flight at a given flight condition while the vibration reducing system is operating in closed loop.
3. An estimate of the baseline helicopter response calculated from the actuator demand signals, transfer matrix and the reduced vibration levels i.e., the vibration level that would prevail if the vibration reducing system was not operating, at a given flight condition.

The latter two parameters require some indication of forward speed and other operating conditions in order to obtain a flight-to-flight comparison for diagnostic purposes. The provision of such a signal(s) may provide a useful means for automated data capture for the vibration monitoring and diagnostic facility of the integrated system of this invention.

An interface unit is provided to facilitate transfer of the diagnostic data to a maintenance ground station.

Upon application of the power supply to the integrated vibration reducing and health monitoring system of this invention the controller will initialise immediately and automatically perform built-in-test (BIT) routines in order to substantiate application programmes and memory, check electrical supplies and check system signals. Once the vibration reducing system is selected the controller will perform an extended BIT, performing an open-loop run in order to further check system operation and provide a transfer matrix estimate for subsequent closed-loop operation. This test will also check correct actuator and sensor functioning.

The loss of a single actuator or accelerometer will result in a BIT fail indication but the system will proceed into closed-loop operation, with the control unit 12 optimised for a reduced order system. However, the loss of more than a predetermined number of accelerometers or actuators will result in a system fail. If the rotor clock is not within range, the system will enter a "wait" state.

The transfer matrix determined from the open-loop run is stored for subsequent diagnostic processing either in the control unit 12 or the separate diagnostic computer 20. The diagnostic processing function continually checks the system for over-limit data signals and if an actuator or sensor malfunction is detected during closed loop operation, a BIT fail will be indicated on the pilot control panel and the system re-optimised for the reduced order system.

Due to the commonality of approach adopted in the embodiments of FIGS. 2 and 3, operational aspects will now be described with particular reference to the embodiment of FIG. 3. Apart from the vibration reducing function as described with reference to the prior art, the diagnostic computer 20 of the integrated system of this invention implements a number of test and diagnostic routines in order to provide system failure and structural health monitoring data. These include:

1. System initialisation and BIT routines which will provide a positive indication of the majority of system faults.
2. An automated open-loop routine as part of the initialisation as hereinbefore described and at each of the four control harmonics. The calculated transfer matrix is used as part of an extended BIT routine and the data stored as the initial condition for pilot initiated enabling of the system at the pilot control panel 21 and for subsequent downloading to the diagnostic computer 20 for diagnostic purposes.
3. Upon receipt of a pre-defined input sequence from either the computer 20 or a speed signal, the diagnostic computer 20 stores the following closed loop data for each control harmonic,
   a) raw and analysed vibration measurements 25 and 19 (magnitude and phase)
   b) actuator demands 18a (magnitude and phase)
   c) transfer matrix 28.

If during operation, any of these data either exceed a predetermined value or are outside a predetermined rate of change, a warning is illuminated for example on the pilot control panel 21. In a system operating with a high level diagnostic capability, an indication of the cause of the exceedance may also be provided.

In addition to the structural health monitoring facility, the integrated system provides a vibration monitoring and diagnostic capability. Vibration data is transferred in one or both of two forms; either as raw data 25 from accelerometers 13 via the sensor interface 23 or as analysed data 19. The data is analysed and interpreted for diagnostic purposes by algorithms which may be incorporated either in the diagnostic computer 20 or in the ground station 22.

Whilst two embodiments have been described and illustrated it will be apparent that many modifications may be made without departing from the scope of the invention as defined in the appended claims.

The aforementioned embodiments have been described in relation to installation in a helicopter: however it will be understood that the integrated vibration reducing and health monitoring system of this invention can be used in any installation having a vibration problem and which will derive benefit from a reduction in vibration and a health monitoring facility. Whilst described and illustrated with reference to a particular vibration reducing system the invention can be incorporated in any vibration reducing system having a plurality of vibration sensors for sensing vibration at a plurality of locations on a structure.

What is claimed is:

1. An integrated vibration reducing and health monitoring system for a helicopter comprising:
   a plurality of vibration sensors for measuring vibration responses located on a helicopter structure;
   a computer;
   a plurality of actuators for inputting forces into the structure to reduce vibration of the structure, said vibration sensors providing first data comprising signals representative of the vibration of the structure to said computer;
   wherein said computer constructs second data comprising a transfer matrix providing a linear transfer relationship between the vibration responses measured by said vibration sensors and the forces from said actuators and representative of the dynamic characteristics of the helicopter,
   said computer further producing third data comprising actuator command signals for inputting calculated actuator control forces; and
   monitoring means for monitoring said second and third data provided by said computer, for comparing said monitored data with predetermined data and for providing a warning signal and diagnostic information if said predetermined data values are exceeded by said monitored data, wherein health monitoring is achieved in relation to helicopter dynamic characteristics independent of flight state characteristics.

2. A system as claimed in claim 1, wherein said predetermined data comprise maximum values and said warning signal is produced if said monitored data exceeds said predetermined data values.

3. A system as claimed in claim 1, wherein said predetermined data comprise an allowable rate of change of said monitored data and said warning signal is produced if said monitored rate of change exceeds said allowable rate of change.

4. A system as claimed in claim 1, wherein said monitoring means includes a further computer programmed with information relating to patterns of vibration response characteristics related to specific structural and component defects wherein said monitoring means provides information relating to the cause of the data exceedance.

* * * * *